(12) United States Patent
Yeghiayan et al.

(10) Patent No.: US 7,409,898 B2
(45) Date of Patent: Aug. 12, 2008

(54) PAPER CUTTER

(76) Inventors: Arra David Yeghiayan, 16 Washington Rd., Windham, NH (US) 03087; John D. Fiegener, 24 Jersey St., Marblehead, MA (US) 01945-2414

( * ) Notice: Subject to any disclaimer, the term of this patent is extended or adjusted under 35 U.S.C. 154(b) by 25 days.

(21) Appl. No.: 11/364,884

(22) Filed: Feb. 27, 2006

(65) Prior Publication Data

US 2006/0260455 A1  Nov. 23, 2006

Related U.S. Application Data

(60) Provisional application No. 60/655,898, filed on Feb. 25, 2005.

(51) Int. Cl.
*B26D 7/02* (2006.01)
*F21V 33/00* (2006.01)

(52) U.S. Cl. .............................. 83/455; 362/89; 83/658

(58) Field of Classification Search ................. 362/89, 362/98; 83/658, 455
See application file for complete search history.

(56) References Cited

U.S. PATENT DOCUMENTS 3,532,018 A * 10/1970 Szabo ........................ 83/455
3,971,276 A *  7/1976 Billows ...................... 83/164

* cited by examiner

*Primary Examiner*—Ken Peterson
*Assistant Examiner*—Sean Michalski
(74) *Attorney, Agent, or Firm*—Hayes Soloway PC (57) ABSTRACT

A paper cutter utilizing a lamp to illuminate a cutline scored into a transparent plastic surface located below directly below the paper to be cut. The silhouette of the cutline acts as the guideline for placement of the cutting blade of the paper cutter to thereby create the exact line of cut. A dual blade rotary cutter is also provided in a paper cutter with a toggle arrangement located on the carriage assembly which allows the user of the cutter to selectively engage one or the other of the blades to engage the cutter.

2 Claims, 8 Drawing Sheets

PAPER CUTTER

CROSS-REFERENCE TO RELATED PATENT APPLICATIONS

This application claims the benefit of Provisional Patent Application Ser. No. 60/655,898 filed on Feb. 25, 2005, the disclosure of which is incorporated in its entirety hereinto by reference.

BACKGROUND OF THE INVENTION

The present invention relates generally to paper cutters. More particularly, the invention is directed to a paper cutter including a cutting board, a rail assembly mounted for pivotal movement between operative and inoperative positions above the cutting board, and a rotary cutting blade carrier assembly mounted on the rail for movement across the cutting board.

The prior art discloses paper cutters of the above type. One of the problems with such cutters concerns providing an indicator for an intended cut which is a precise registration between the indicator and the true cut. If the indicator is independent from the cutter, normal and unavoidable manufacturing tolerances will create a disparity between the two, creating a cutting error instead of giving the precise and predictable results desired.

Another problem is that the cut line should ideally be visible while the paper is unobstructed by any clamp or cutting mechanism, so that the overall image may be clearly seen as it is positioned before the cut is made.

Yet another problem is that many times it is required or desirable to make different cuts in succession which are done by different cutters. The need to change the cutter to make the different styles of cuts takes time and makes that task substantially more difficult.

BRIEF SUMMARY OF THE INVENTION

The design of the invention solves the above problems with a paper that is safe to use and compact. A single reference surface performs the dual function of creating the silhouette and providing the guiding surface for the cutting blade. The cut line is therefore always the same as the silhouette line, and independent from manufacturing tolerances. The carriage assembly for the rotary cutting blades provides support for two circular blades arranged to run along a rail in side-by-side relationship. A toggle arrangement is provided to select the blade to do the cutting. The toggle includes a cam which responds to a movable lever to select one of the blades for engagement with the cutting surface. The cutting surface consists of a backlit transparent plastic bar which is backlit. The first time the cutter is rolled along the bar, the blade forms a sharply defined hairline groove in the plastic. The backlight illuminates the paper on both sides of the cutline, and projects the silhouette of the groove onto the paper, creating a visible hairline which indicates exactly where the cut will fall.

BRIEF DESCRIPTION OF THE SEVERAL VIEWS OF THE DRAWINGS

A complete understanding of the present invention may be obtained by reference to the accompanying drawings, when considered in conjunction with the subsequent, detailed description, in which.

DETAILED DESCRIPTION OF THE INVENTION

Figure 1:
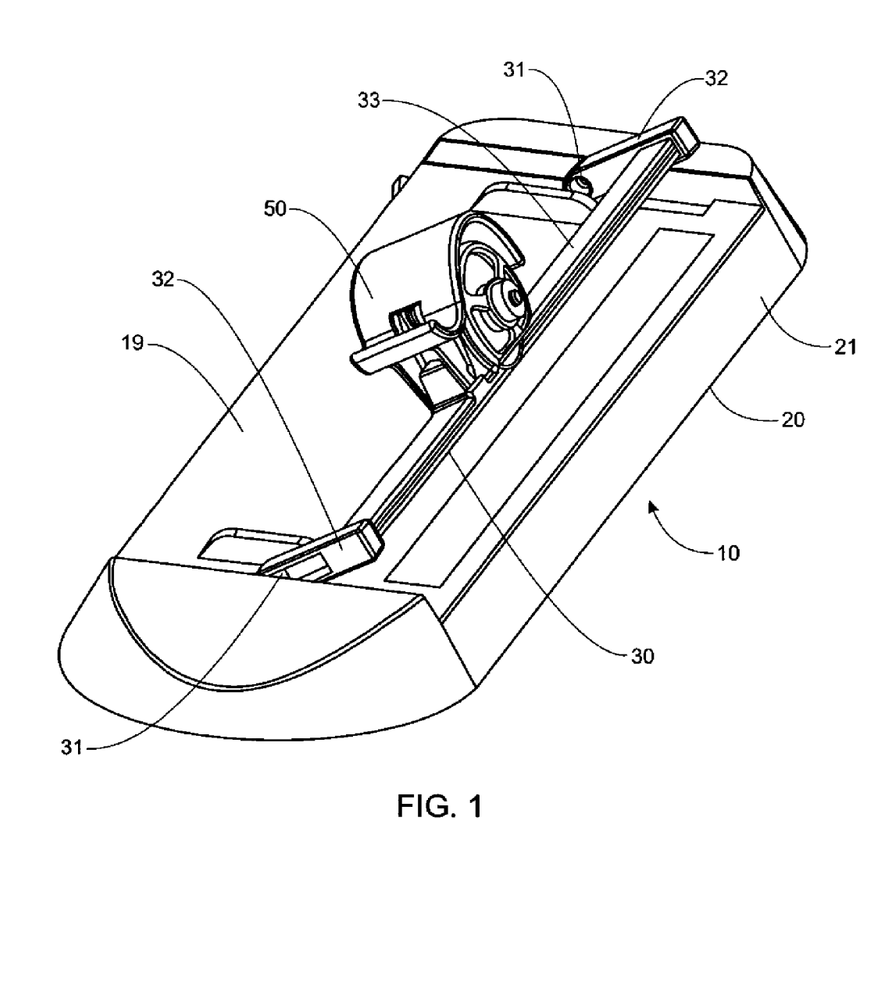
FIG. 1 is a perspective view of the paper cutter of the invention with the rail and carriage assemblies in the upward or disengaged position.
Figure 2:
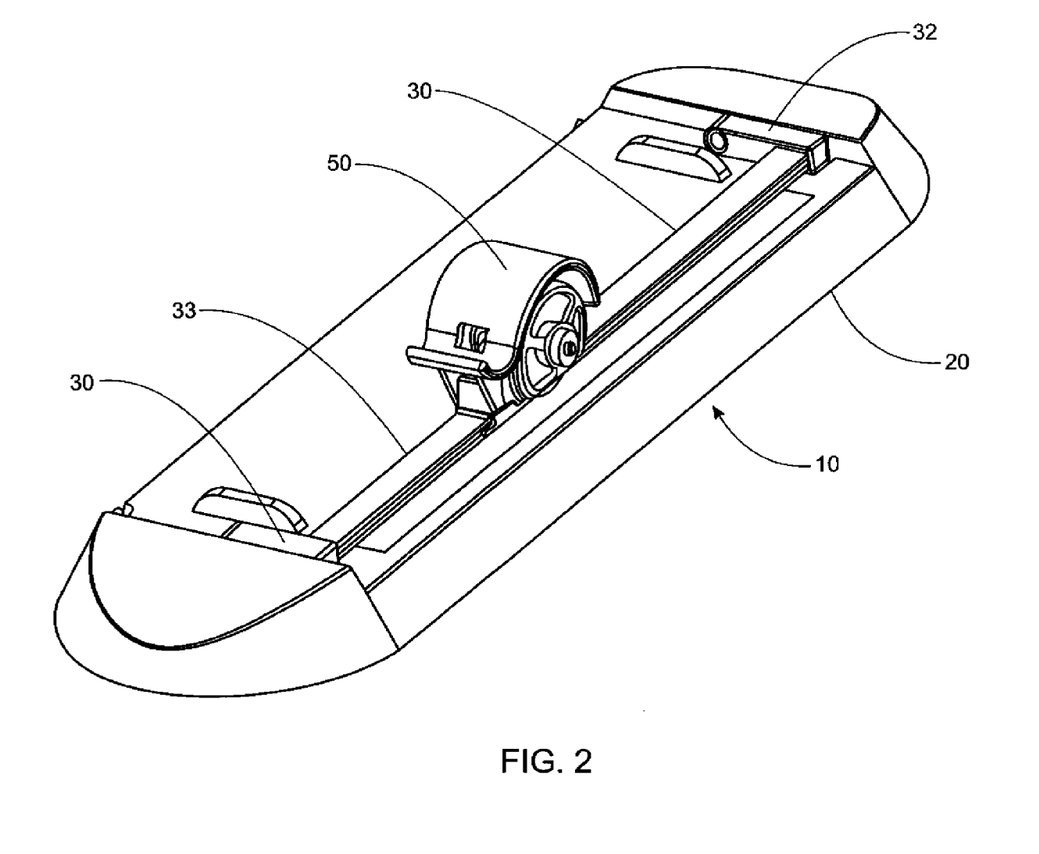
FIG. 2 is a perspective view of the paper cutter of the invention, similar to FIG. 1 but showing the rail and carriage assemblies in the downward or engaged position.
Figure 3:
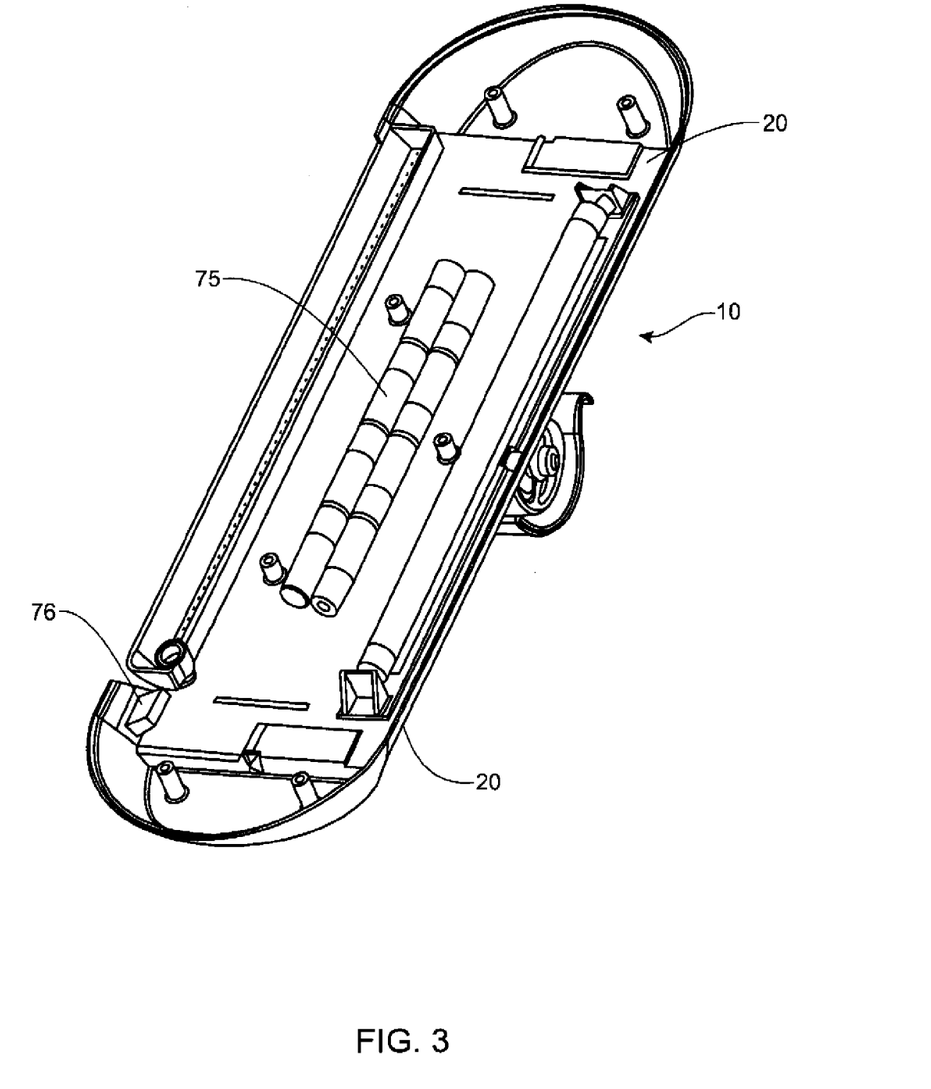
FIG. 3 is a bottom, perspective view of the paper cutter of the invention showing the components parts of the cutting board assembly, the lamp, and the battery pack with its compartment cut away.
Figure 4:
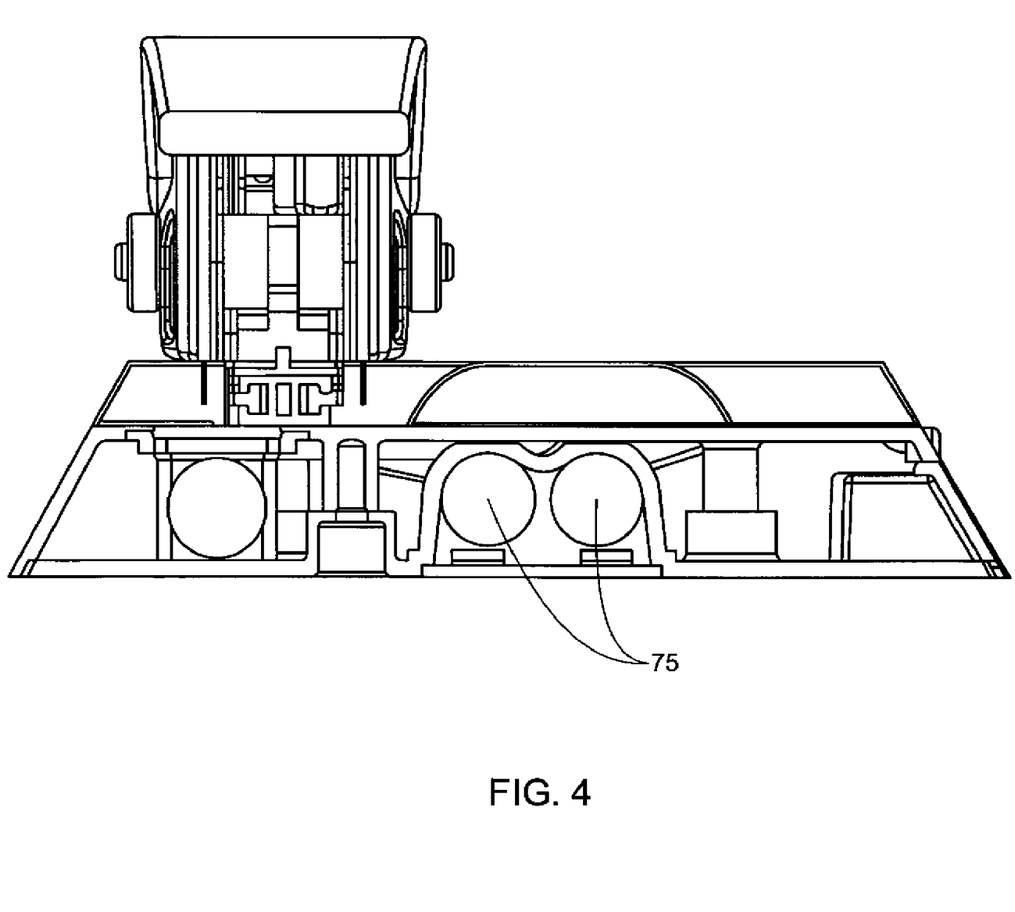
FIG. 4 is a cross sectional elevation view showing the interior of the cutting board enclosure with its components, and the relationship between the rail assembly and the carriage assembly.

Referring to FIGS. 1-3, there is shown a paper cutter 10 including a cutting board 20, an elongated rail assembly 30 and a carriage assembly 50 slidably mounted to move backward and forward along the rail assembly 30 in a direction parallel to the front surface 21 of the cutting board 20. The rail assembly 30 is mounted for pivotal movement on separate pairs of pivot pins and arms which permit the rail assembly 30 and a rail 33 to pivot toward and away from the top surface 19 of the cutting board 20 with the long axis of the rail 33 parallel to the front surface 21. The top surface of the 19 cutting board 20 is provided with scales or indicia strips (not shown) which run perpendicular to the front surface 21 and the long axis of the rail assembly 30. The scales are calibrated in the usual units of length normally used for measuring paper.

Figure 5:
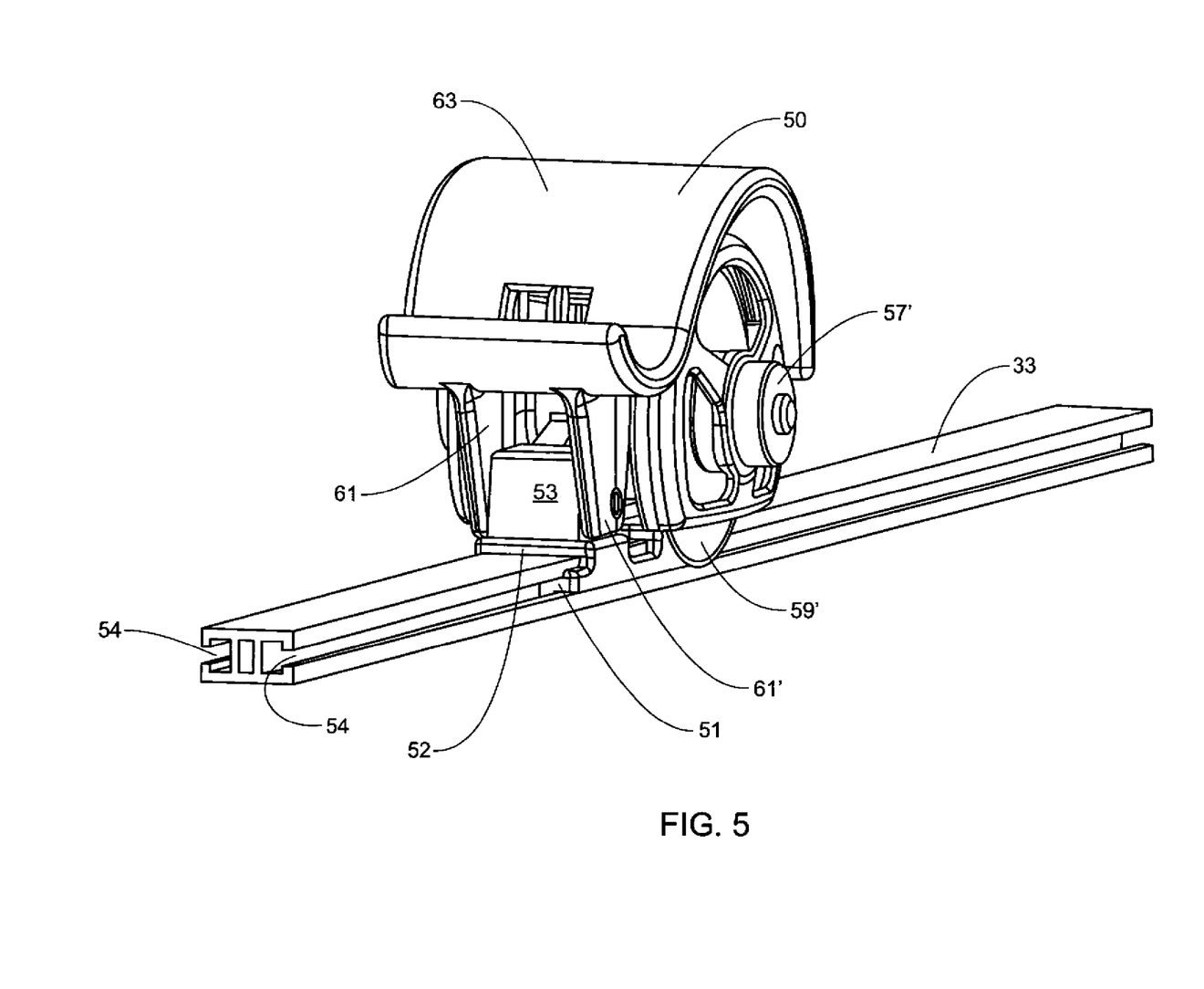
FIG. 5 is an isolated, perspective view of the rail and carriage assembly.
Figure 6:
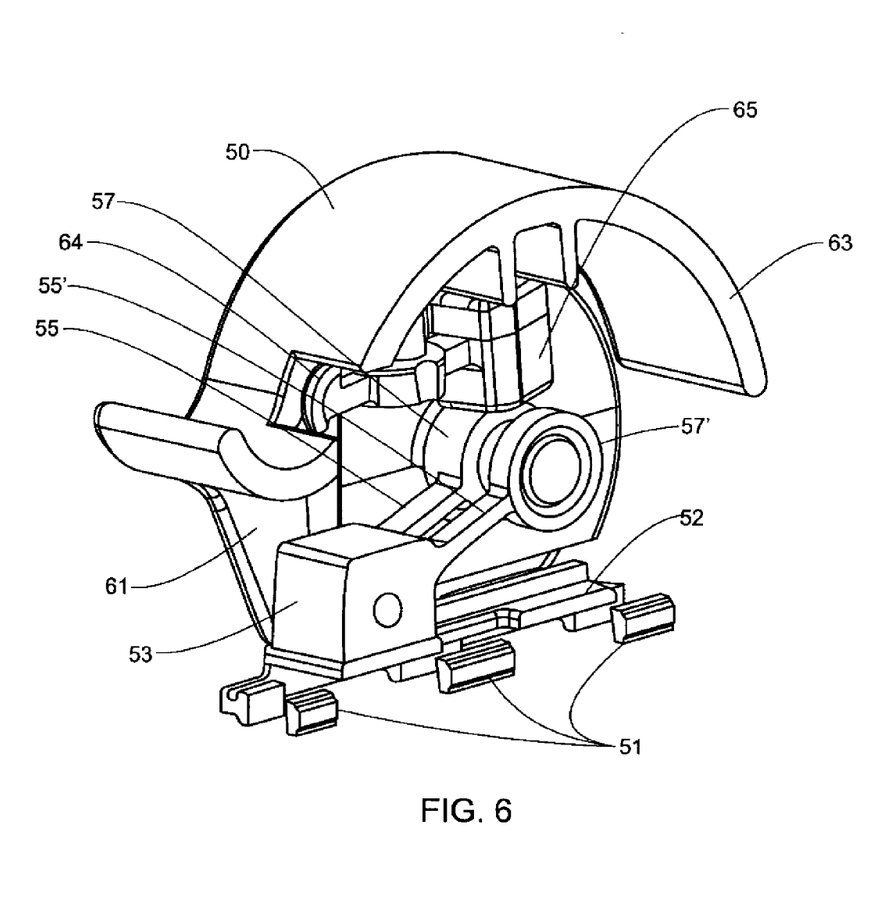
FIG. 6 is an isolated perspective view of the carriage assembly with portions of the graspable canopy broken away to expose interior parts of the toggle assembly.
Figure 7:
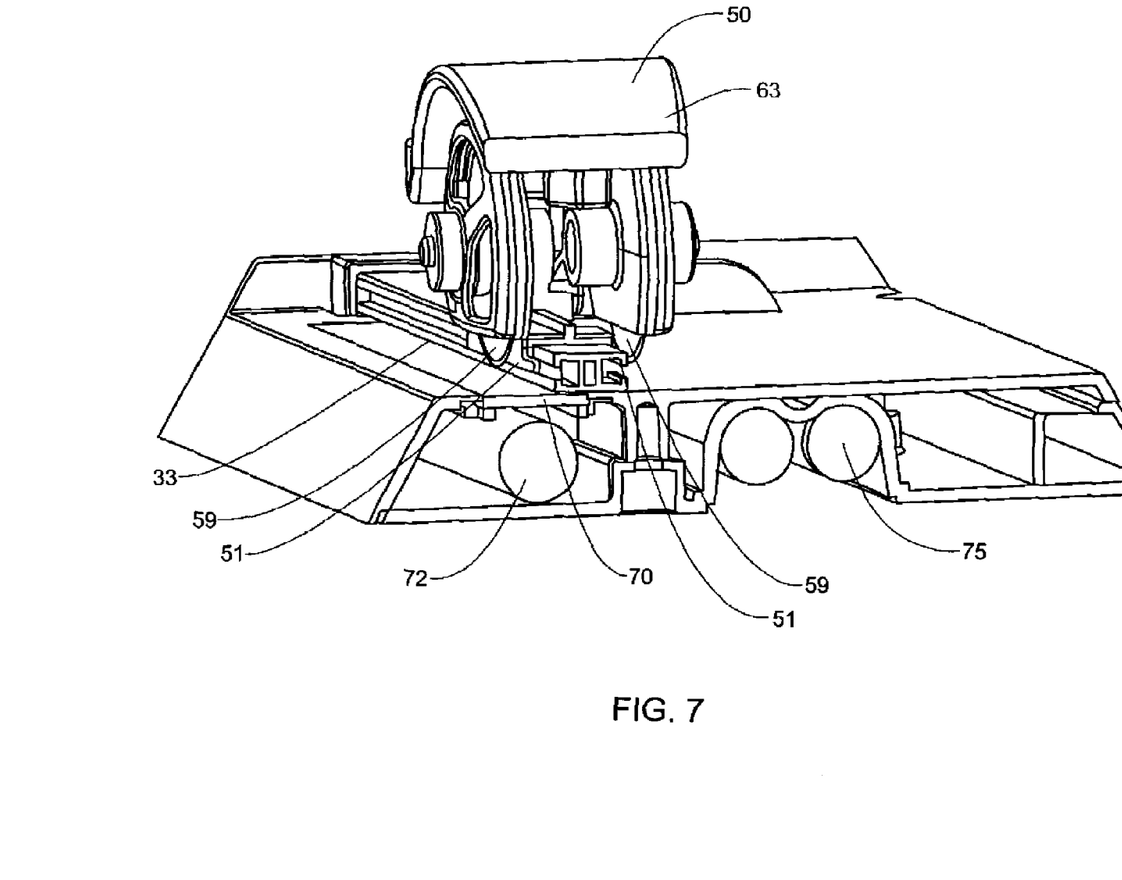
FIG. 7 is another cross section elevation perspective showing interior portions of the enclosure and carriage and rail assemblies.
Figure 8:
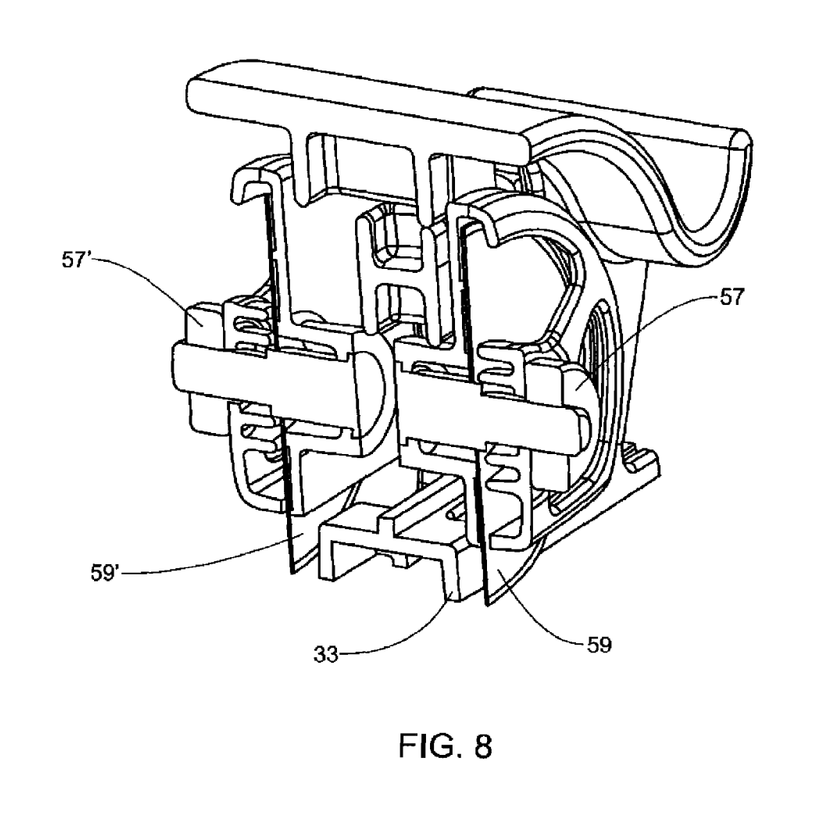
FIG. 8 is a cross sectional perspective view of the carriage assembly in isolation showing interior portion of the cutter blade mounting and support structure.

The rail 33 on which the carriage assembly 50 is mounted is made of aluminum and shaped generally as shown in FIG. 5. The carriage assembly 50 includes runners 51 which interfit for sliding engagement into the generally U shaped elongated slots 54 running the length of the rail 33, as best seen in FIGS. 5-7. The runners 51 are formed integral with a central support platform 52 which in turn supports an upstanding rectangular support block 53 from which a pair of arms 55, 55' project to support cutter wheel assemblies 57, 57'. The wheel assembly 57' is associated with cutter blade 59' and the assembly 57 is associated with blade 59. as best seen in FIGS. 5 and 6.

Two spaced apart ribs 61, 61' extend from the central support platform 52 to the palm piece 63 to permit the user of the paper cutter 10 to move the carriage assembly 50 along the rail 33 by exerting a downward/forward force on the palm piece 63, that force being transmitted from the palm piece 63 through the ribs 61, 61' to the central support platform 52 and the runners 51.

A toggle switch 64 projects out of an opening in the palm piece 63 to permit the user to select either one of the cutter blades 59, 59' to be brought into contact with the paper sheets below the two cutter blades 59, 59'. If the toggle switch 64 is turned to the right (as seen in FIG. 6), the cam 65 is moved to the left to couple the underside of the palm piece 63 to the wheel assembly 57 and transmit force to the associated cutter blade 59. If the toggle switch 64 is turned to the left, as seen in FIG. 6, the cam 65 moves to the right to activate the wheel assembly 57' and its associated cutter blade 59'.

Referring to FIG. 7 it is seen that paper to be cut is passed over a clear plastic window 70 which is located directly over a light source 72 such as a fluorescent lamp. The cutline is made in the clear plastic window 70 by activating the toggle switch 64 to bring the cutter blade 59' into contact with the clear plastic window 70 to score a shallow cut thereinto. When paper is subsequently passed over the clear plastic window 70 the cutline in the clear plastic window 70 is silhouetted in the paper to allow the user to register the exact location of the cut. The cutter blade 59 cuts paper resting on the upper surface 19 of the cutting board 20. The cutter blade 59 is designed to provide decorative cut patterns, such as a zig-zag or a scallop.

A battery pack 75 is located in a bottom wall of the cutting board 20 to energize the light source 72 which is controlled by a switch.

What is claimed is:

1. A paper cutter comprising: a cutting board including a top surface on which paper is adapted to be supported while being cut; a rail assembly mounted for pivotal movement between engaged and disengaged positions with respect to said cutting board, a carriage assembly mounted for sliding movement on said rail assembly, the carriage assembly including a blade for cutting said paper; a transparent surface, said transparent surface having cutline formed by said blade, and a lamp on the side of said transparent surface removed from said paper for shining light through said transparent surface onto said paper, said light source projecting a guideline formed from the cutline through said paper.

2. A paper cutter comprising: a cutting board including a top surface on which paper is adapted to be supported while being cut; a rail assembly mounted for pivotal movement between engaged and disengaged positions with respect to said cutting board, a carriage assembly mounted for sliding movement on said rail assembly, the carriage assembly including a blade for cutting said paper; a transparent surface, said transparent surface to be scored, having a outline formed by said blade during operation, and a lamp on the side of said transparent surface removed from said paper for shining light through said transparent surface onto said paper, said light source projecting a guideline formed from the cutline through said paper.

* * * * *